United States Patent
Holland et al.

(10) Patent No.: US 11,729,403 B2
(45) Date of Patent: Aug. 15, 2023

(54) LOSSLESS PIXEL COMPRESSION BASED ON INFERRED CONTROL INFORMATION

(71) Applicant: INTEL CORPORATION, Santa Clara, CA (US)

(72) Inventors: James Holland, Folsom, CA (US); Hiu-Fai Chan, Rancho Cordova, CA (US); Fangwen Fu, Folsom, CA (US); Qian Xu, Folsom, CA (US); Sang-Hee Lee, San Jose, CA (US); Vidhya Krishnan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 16/647,998

(22) PCT Filed: Dec. 5, 2017

(86) PCT No.: PCT/CN2017/114614
§ 371 (c)(1),
(2) Date: Mar. 17, 2020

(87) PCT Pub. No.: WO2019/109248
PCT Pub. Date: Jun. 13, 2019

(65) Prior Publication Data
US 2020/0288152 A1    Sep. 10, 2020

(51) Int. Cl.
*H04N 11/02*    (2006.01)
*H04N 19/182*    (2014.01)
*H04N 19/423*    (2014.01)

(52) U.S. Cl.
CPC ......... *H04N 19/182* (2014.11); *H04N 19/423* (2014.11)

(58) Field of Classification Search
CPC ............................ H04N 19/182; H04N 19/423
USPC ............ 375/240.12; 382/166, 233; 345/543; 257/783
See application file for complete search history.

(56) References Cited

U.S. PATENT DOCUMENTS

| 6,366,289 B1 * | 4/2002 | Johns ................... G06F 12/023 345/543 |
| 9,778,937 B1 * | 10/2017 | Sivertsen ........... H04N 21/4435 |
| 2009/0052772 A1 | 2/2009 | Speirs et al. |

(Continued)

FOREIGN PATENT DOCUMENTS

| CN | 101142821 | 3/2008 |
| JP | 2010219708 | 9/2010 |

(Continued)

OTHER PUBLICATIONS

International Search Report and Written Opinion for International Patent Application No. PCT/CN17/114614, dated Aug. 27, 2018.

(Continued)

*Primary Examiner* — Jayanti K Patel
*Assistant Examiner* — Richard B Carter
(74) *Attorney, Agent, or Firm* — Essential Patents Group, LLP

(57) ABSTRACT

A lossless pixel compressor may include technology to detect a format of a pixel memory region, and compress the pixel memory region together with embedded control information which indicates the detected format of the pixel memory region. Other embodiments are disclosed and claimed.

25 Claims, 10 Drawing Sheets

(56) References Cited

U.S. PATENT DOCUMENTS

| | | | |
|---|---|---|---|
| 2011/0235928 A1* | 9/2011 | Strom .................. | H04N 19/115 |
| | | | 382/233 |
| 2012/0014597 A1* | 1/2012 | Matsunaga ............ | H04N 1/644 |
| | | | 382/166 |
| 2013/0188065 A1 | 7/2013 | Wegener | |
| 2016/0133605 A1* | 5/2016 | Bae ........................ | H01L 24/32 |
| | | | 257/783 |

FOREIGN PATENT DOCUMENTS

| | | |
|---|---|---|
| TW | I555386 | 10/2016 |
| WO | 2006090334 | 8/2006 |
| WO | 2007107924 | 9/2007 |

OTHER PUBLICATIONS

Office Action and English translation for Taiwan Patent Application No. 107136056, dated Sep. 27, 2022.
Search Report for Taiwan Patent Application No. 107136056, dated Apr. 6, 2022.

* cited by examiner

| Table Index | L0 | L1 | Bitmap (bit/pixel) | Min | Max |
|---|---|---|---|---|---|
| 0 | 0 | 0 | 0 | 0 | 0 |
| 1 | 2 | 0 | 0 | -2 | 1 |
| 2 | 3 | 0 | 0 | -4 | 3 |
| 3 | 2 | 3 | 1 | -6 | 5 |
| 4 | 2 | 4 | 1 | -10 | 9 |
| 5 | 2 | 5 | 1 | -18 | 17 |
| 6 | 3 | 6 | 1 | -36 | 35 |
| 7 | 4 | 8 | 1 | -256 | 256 |

4X4X4 2-D+512b Monochrome Compressed CL Layout of 8b Values

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
| 0 | 2D | 2D | 1D | 2D | 2D | 2D | 1D | 2D | 2D | 2D | 1D | 2D | 2D | 2D | 1D | 2D |
| 1 | 2D | 2D | 1D | 2D | 2D | 2D | 1D | 2D | 2D | 2D | 1D | 2D | 2D | 2D | 1D | 2D |
| 2 | 1D | 1D | UC | 1D | 1D | 1D | UC | 1D | 1D | 1D | UC | 1D | 1D | 1D | UC | 1D |
| 3 | 2D | 2D | 1D | 2D | 2D | 2D | 1D | 2D | 2D | 2D | 1D | 2D | 2D | 2D | 1D | 2D |

UC: Uncompressed 'seed' value
1D: Compressed error based on 1 of top\Left\Bot\Right predictions
2D: Compressed error based on Top\Bot and Left\Right predictions

LOSSLESS PIXEL COMPRESSION BASED ON INFERRED CONTROL INFORMATION

CLAIM OF PRIORITY

This Application is a National Stage Entry of, and claims priority to, PCT Application No. PCT/CN2017/114614 filed on 5 Dec. 2017 and titled "LOSSLESS PIXEL COMPRESSION BASED ON INFERRED CONTROL INFORMATION", which is incorporated by reference in its entirety for all purposes.

TECHNICAL FIELD

Embodiments generally relate to graphics systems. More particularly, embodiments relate to lossless pixel compression based on inferred control information.

BACKGROUND

Lossless compression may refer to data compression that allows the original data to be perfectly restored from the compressed data. Lossy compression, on the other hand, may permit restoration of only an approximation of the original data. Lossy compression may improve compression rates and reduce data sizes. Lossless data compression may be used by various applications such as ZIP (.zip files) and GZIP (.gz files). Lossless compression may be more suitable where the original and the decompressed data need to be identical, such as executable programs, text documents, source code, etc. Lossy compression may be more suitable where an approximation of the original may be acceptable, such as audio files/formats (e.g., WMA, MP3), picture files/formats (e.g., JPEG, PNG), video files/formats (e.g., WMV, MP4), etc.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
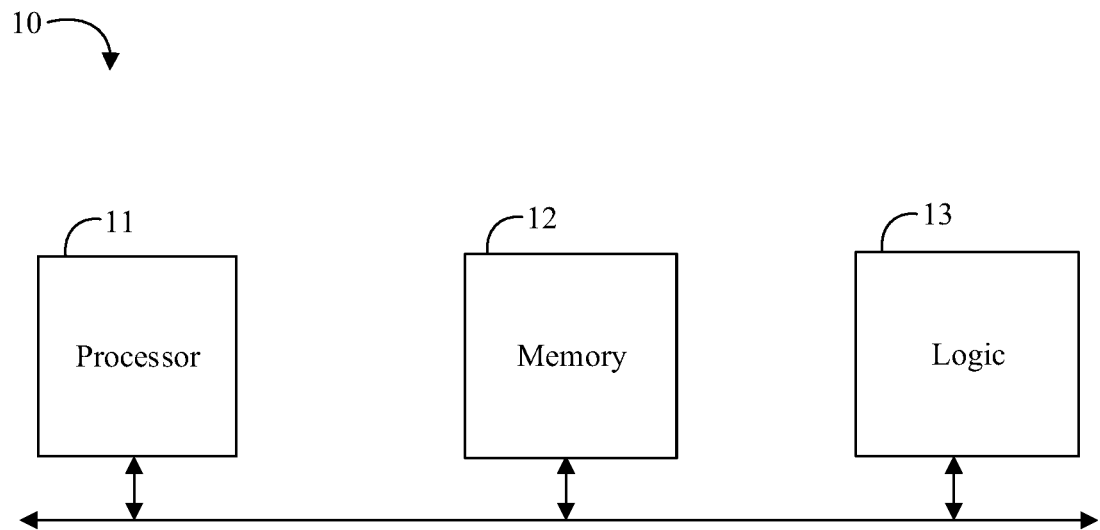
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to detect a format of a pixel memory region, and compress the pixel memory region together with embedded control information which indicates the detected format of the pixel memory region. In some embodiments, the logic 13 may be further configured to determine compression results for two or more compression techniques, select one of the two or more compression techniques based on the determined compression results, and compress the pixel memory region using the selected compression technique together with the embedded control information. For example, the logic 13 may be configured to compress a portion of the pixel memory region using one of the two or more compression techniques, and estimate the compression results for the entire pixel memory region based on a compression result for the compressed portion of the pixel memory region. Additionally, or alternatively, the logic 13 may also be configured to compare a compression result for one of the two or more compression techniques against a threshold, and select one of the two or more compression techniques based on the threshold comparison. In some embodiments, the logic 13 may be further configured to sub-divide cachelines into sub-regions which are independently compressible, and/or to sub-divide cachelines into sub-regions which are independently decompressable. In some embodiments, the logic 13 may also be configured to rearrange bytes of the pixel memory region into sub-regions based on the detected pixel format (e.g. the sub-regions may be more homogeneous or more compressible when appropriately rearranged). For example, the logic 13 may also be configured to detect a depth of the pixel memory region. In some embodiments, the embedded control information may include an index to a multi-level applied compression table (e.g., as described in more detail herein).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, detecting a format of a pixel memory region, compressing the pixel memory region together with embedded control information which indicates the detected format of the pixel memory region, etc.).

Figure 2:
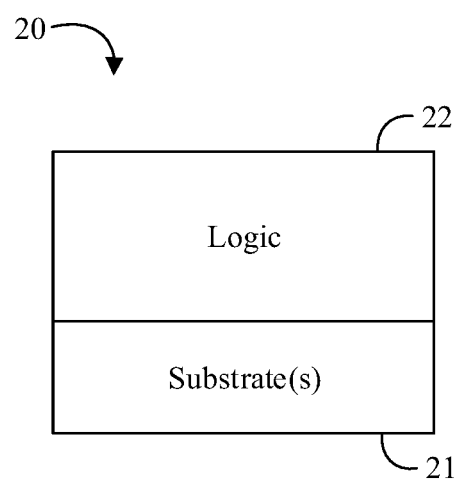
FIG. 2 is a block diagram of an example of a semiconductor package apparatus according to an embodiment.
Figure 3A:
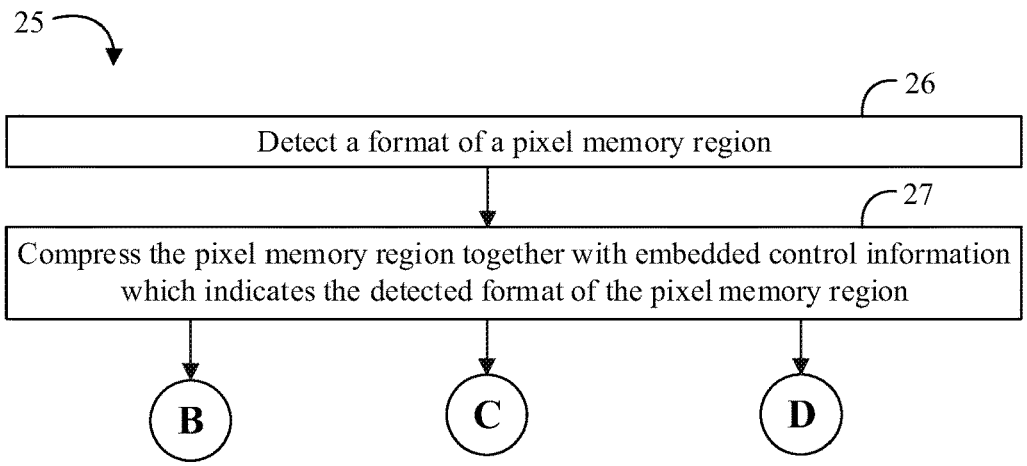
FIGS. 3A to 3D are flowcharts of an example of a method of compressing pixels according to an embodiment.
Figure 3B:
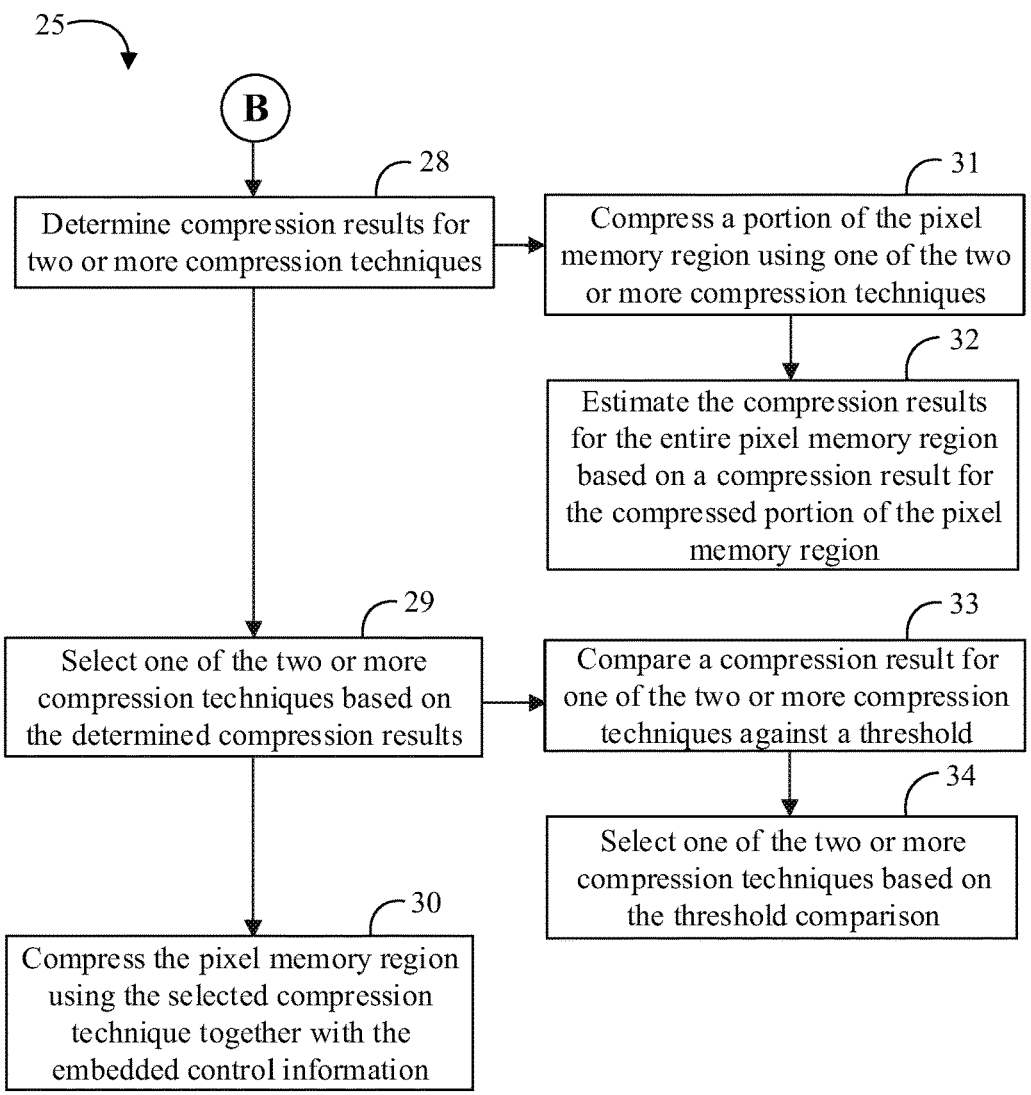
Figure 3C:
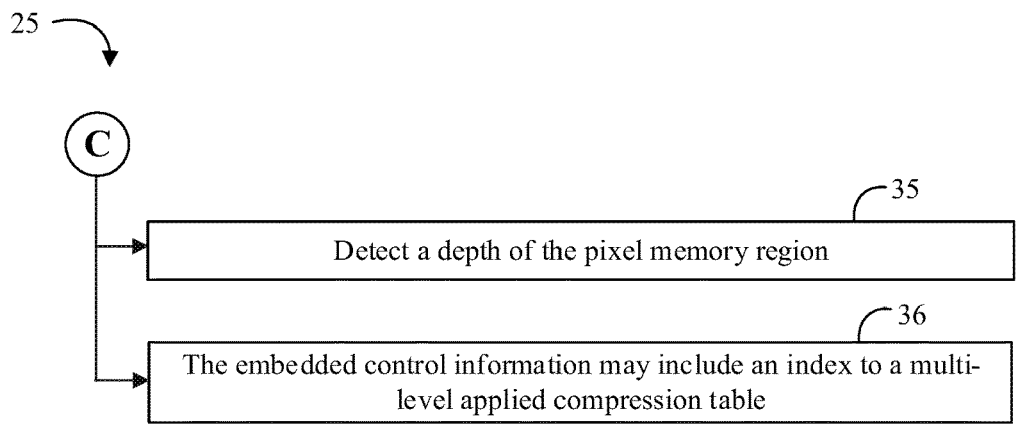
Figure 3D:
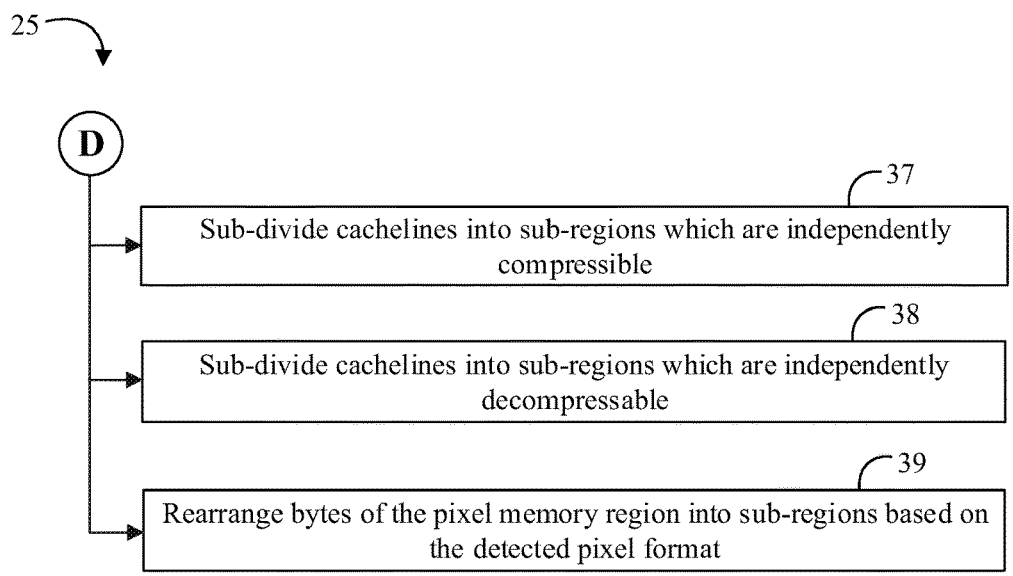

Turning now to FIG. 2, an embodiment of a semiconductor package apparatus 20 may include a substrate 21, and logic 22 coupled to the substrate, wherein the logic 22 is at least partly implemented in one or more of configurable logic and fixed-functionality hardware logic. The logic 22 coupled to the substrate 21 may be configured to detect a format of a pixel memory region, and compress the pixel memory region together with embedded control information which indicates the detected format of the pixel memory region. In some embodiments, the logic 22 may be further configured to determine compression results for two or more compression techniques, select one of the two or more compression techniques based on the determined compression results, and compress the pixel memory region using the selected compression technique together with the embedded control information. For example, the logic 22 may be configured to compress a portion of the pixel memory region using one of the two or more compression techniques, and estimate the compression results for the entire pixel memory region based on a compression result for the compressed portion of the pixel memory region. Additionally, or alternatively, the logic 22 may also be configured to compare a compression result for one of the two or more compression techniques against a threshold, and select one of the two or more compression techniques based on the threshold comparison. In some embodiments, the logic 22 may be further configured to sub-divide cachelines into sub-regions which are independently compressible, and/or to sub-divide cachelines into sub-regions which are independently decompressable. In some embodiments, the logic 22 may also be configured to rearrange bytes of the pixel memory region into sub-regions based on the detected pixel format (e.g. the sub-regions may be more homogeneous or more compressible when appropriately rearranged). For example, the logic 22 may also be configured to detect a depth of the pixel memory region. In some embodiments, the embedded control information may include an index to a multi-level applied compression table.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Turning now to FIGS. 3A to 3D, an embodiment of a method 25 of compressing pixels may include detecting a format of a pixel memory region at block 26, and compressing the pixel memory region together with embedded control information which indicates the detected format of the pixel memory region at block 27. Some embodiments of the invention may further include determining compression results for two or more compression techniques at block 28, selecting one of the two or more compression techniques based on the determined compression results at block 29, and compressing the pixel memory region using the selected compression technique together with the embedded control information at block 30. For example, the method 25 may include compressing a portion of the pixel memory region using one of the two or more compression techniques at block 31, and estimating the compression results for the entire pixel memory region based on a compression result for the compressed portion of the pixel memory region at block 32. Additionally, or alternatively, the method 25 may include comparing a compression result for one of the two or more compression techniques against a threshold at block 33, and selecting one of the two or more compression techniques based on the threshold comparison at block 34. For example, the method 25 may also include detecting a depth of the pixel memory region at block 35. In some embodiments, the embedded control information may include an index to a multi-level applied compression table at block 36. Some embodiments of the method 25 may further include sub-dividing cachelines into sub-regions which are independently compressible at block 37, and/or sub-dividing cachelines into sub-regions which are independently decompressable at block 38. For example, the method 25 may also include rearranging bytes of the pixel memory region into sub-regions based on the detected pixel format at block 39 (e.g. the sub-regions may be more homogeneous or more compressible when appropriately rearranged).

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 19 to 27 below. Embodiments or portions of the method 25 may be implemented in firmware, applications (e.g., through an application programming interface (API)), or driver software running on an operating system (OS).

Figure 4:
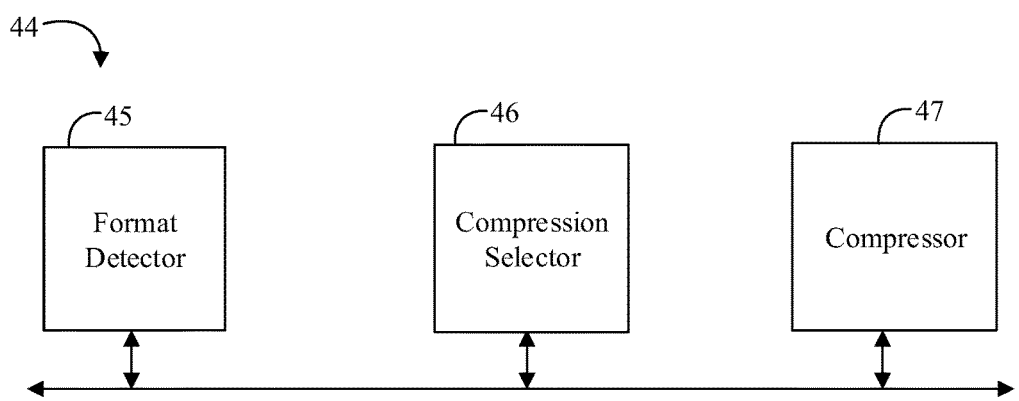
FIG. 4 is a block diagram of an example of a lossless pixel compressor according to an embodiment.

Turning now to FIG. 4, an embodiment of a lossless pixel compressor 44 may include a format detector 45 communicatively coupled to a compression selector 46 and a compressor 47. The format detector 45 may include technology to detect a format of a pixel memory region, and the compressor 47 may include technology to compress the pixel memory region together with embedded control information which indicates the detected format of the pixel memory region. In some embodiments, the compression selector 46 may include technology to determine compression results for two or more lossless pixel compression techniques, and to select one of the two or more lossless pixel compression techniques based on the determined compression results. The compressor 47 may compress the pixel memory region using the selected lossless pixel compression technique together with the embedded control information. For example, the compression selector 46 may work with the compressor 47 to compress a portion of the pixel memory region using one of the two or more lossless pixel compression techniques, and estimate the compression results for the entire pixel memory region based on a compression result for the compressed portion of the pixel memory region. Additionally, or alternatively, the compression selector 46 may also include technology to compare a compression result for one of the two or more lossless pixel compression techniques against a threshold, and select one of the two or more lossless pixel compression techniques based on the threshold comparison. For example, the format detector 45 may also include technology to detect a depth of the pixel memory region. In some embodiments, the embedded control information may include an index to a multi-level applied compression table. In some embodiments, the compressor 47 may be further configured to sub-divide cachelines into sub-regions which are independently compressible, and/or to sub-divide cachelines into sub-regions which are independently decompressable. In some embodiments, the compressor 47 may also be configured to rearrange bytes of the pixel memory region into sub-regions based on the detected pixel format (e.g., to increase compression). For example, ARGBARGB may be reformatted to AARRGGBB so each sub-region may be more homogeneous and may compress better. Similarly, rearranging ARGBARGB as ARARGBGB may not necessarily be more homogeneous, but ARARGBGB may still compress better than the ARGBARGB in some cases.

Embodiments of the format detector 45, the compression selector 46, the compressor 47, and other components of the lossless pixel compressor 44, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously utilize inferred control information for lossless pixel memory compression. In lossless memory compression for 2D image applications, for example, various memory packing structures are common. Some embodiments may advantageously automatically detect common formats and embed the detected format within a compressed cacheline. Some embodiments may advantageously reduce or eliminate the need to transmit sideband information, and may not require the transmitter to encode the memory layout explicitly that would be used by the compressor.

Some embodiments may additionally, or alternatively, improve compression in cases where certain pixel patterns may achieve higher compression with a format which may be different from an originally declared format. For example, when a pair (or more) of cachelines is provided to an embodiment of a compressor block, rather than explicitly signaling what the layout is (e.g., 8-8-8-8, 10-10-10-2, 16-16 with only 10 bits used, etc.), the compressor may detect the format by trying various combinations of byte groupings. The best compression technique may then be selected and control information may be embedded in the compressed cacheline(s) for the decompressor to use.

Some embodiments may advantageously provide improved power and performance of video and pixel based memory applications without degrading image quality on a greater set of pixel formats and layouts than may be possible if all types were managed throughout the internal processing of compressing and decompressing. For example, a P010 format may utilize a word (16 bits) for every pixel value even though the allowable range for any pixel is limited to 1023, requiring only 10 bits. The upper six (6) bits are always zero (0) and an embodiment of a compressor may detect this pattern and signal with one (1) bit the presence of 192 zeros (e.g., providing about 192 to 1 lossless compression).

In some other systems, each pixel may be variable length encoded, except for a seed, and various details about how the data is compressed may be handled through sideband information. Rather than treat each pixel as a byte or a word strictly, and compute the deltas amongst each pixel one by one, some embodiments may analyze the whole of a cacheline to detect key patterns that may be signaled within the cacheline as embedded information to be used by the decompressor. Some embodiments may simplify the control information handling (e.g., by software) and may also improve compression in cases where mixed formats are used within the same memory region.

Figures 5, 6:
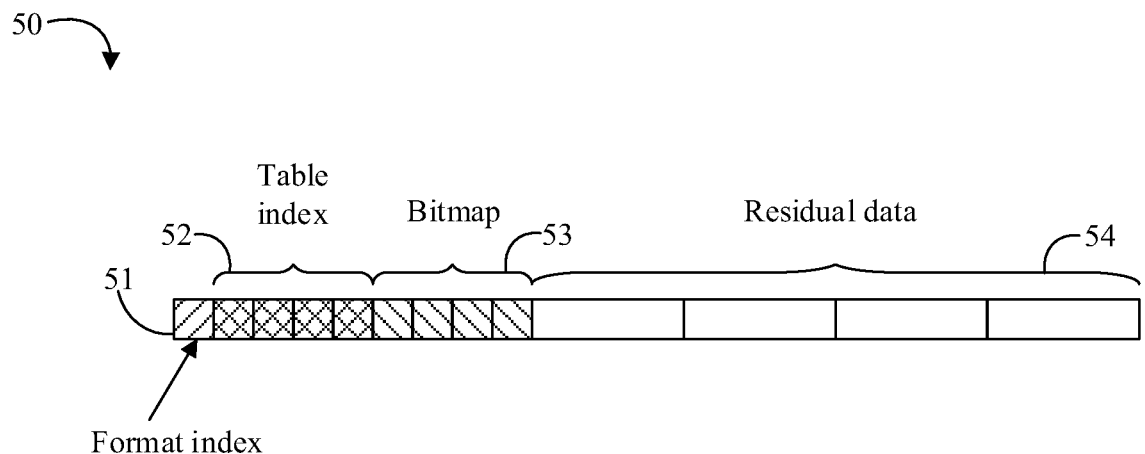
FIG. 5 is an illustrative diagram of an example of a residual format for a compressed cacheline according to an embodiment.
FIG. 6 is an illustrative diagram of an example of a multi-level applied compression table according to an embodiment.

Turning now to FIG. 5, an embodiment of residual format for a compressed cacheline 50 may include embedded control information. For example, the cacheline 50 may include a format index 51 to indicate a format for the whole cacheline 50, a table index 52, a bitmap portion 53, and residual data 54. For example, a cacheline may include 512 bits which may be organized as sixty-four (64) eight (8) bit bytes representing four (4) groups of sixteen (16) bytes or four (4) 4×4 blocks of pixels. In some embodiments, the format index 51 may include five (5) bits to index up to 32 different formats, the table index 52 may include three (3) bits for each of four 4×4 blocks to index up to 8 entries in a multi-level applied compression table (e.g., 12 bits total for the table index 52), and the bitmap portion 53 may include fifteen (15) bits per coded 4×4 block (e.g., up to 60 bits total for the bitmap portion 53). The residual data 54 may include an adaptive two-length residual per pixel within each coded 4×4 block. Depending on the data in the cacheline 50, the bitmap portion 53 and/or the residual data 54 may not be coded for one or more of the 4×4 blocks.

Turning now to FIG. 6, an embodiment of a multi-level applied compression table 60 may include eight (8) table entries. Each entry zero (0) through seven (7) may include a level 0 (L0) value, a level one (L1) value, a bitmap value, a minimum (Min) value, and a maximum (Max) value. The table 60 may be considered a two-level applied compression table. Other embodiments may include more levels and/or more or fewer table entries. The table 60 may be used to determine what compression technique has been applied to a cacheline. For example, the information in the table 60 may be utilized to generate what may have been previously communicated as sideband information that tagged along with each set of compressed data. Advantageously, because the Min and Max values are not included in sideband information, a wider range of Min and Max residual values may be supported and some embodiments may provide improved or more optimal compression.

For some embodiments of the table 60, for table entry zero (0), there may be no bitmap and residual to code (e.g., seeds may be always explicitly coded). For table entries one (1) and two (2), there may be no bitmap to code. For table entries three (3) through seven (7), there may be both bitmap and residual to code. For table entry seven (7), if 8 bits are required some embodiments may code the raw data instead of the residual.

In the table 60, the L0 values may correspond to the number of bits used to represent the residual value if the corresponding bitmap value is 0. The L1 values may correspond to the number of bits used to represent the residual value if the corresponding bitmap value is 1. The bitmap value provides one bit per pixel of a 4×4 block, excluding the seed (e.g., 15 bits per 4×4 block). If the bitmap is coded, each bit represents either L0 or L1 being used to code the corresponding residual. The Min value may represent a minimum residual value for the entry, while the Max value may represent a maximum residual value for the entry.

Figures 7, 8:
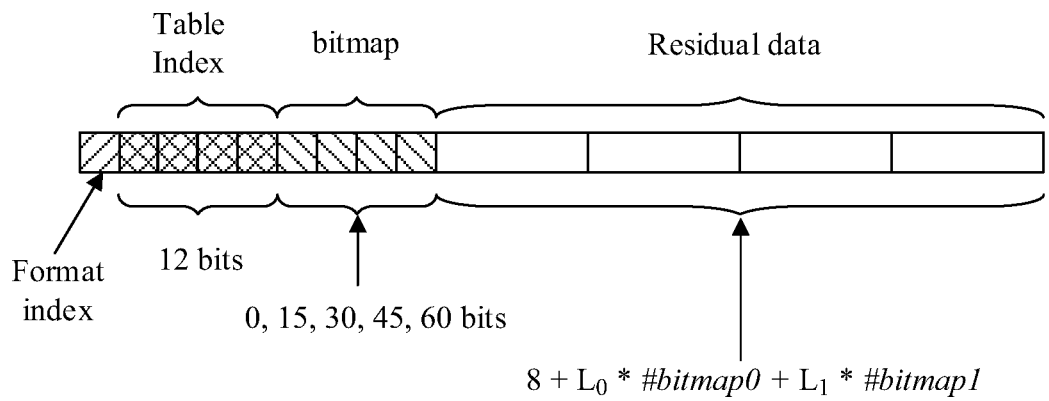
FIG. 7 is an illustrative diagram of a starting point computation for a compressed cacheline according to an embodiment.
FIG. 8 is an illustrative diagram of a compressed cacheline layout according to an embodiment.

Turning now to FIG. 7, an embodiment of a starting point computation 70 for decode of a cacheline may include the following calculation:

$$\text{starting\_point} = k + L0 * \#\text{bitmap0} + L1 * \#\text{bitmap1} \quad [\text{Eq. 1}]$$

where k corresponds to the number of bits to represent the first pixel value in each 4×4 block (e.g., k=8), #bitmap0 corresponds to the bitmap value 0 at the specified position in 4×4 block, and #bitmap1 corresponds to the bitmap value 1 at the specified position in 4×4 block. Using the table 60, residual decoding may be performed for each pixel as follows. If the pixel is a seed pixel, 8 bits may be used to decode the pixel value (e.g., the seed may be pulled out into a separate segment). If the cacheline bitmap value for the pixel is 0, L0 may be used to decode the pixel value. Otherwise, L1 may be used to decode the pixel value.

Prediction on the compressor side may be the same as in decompressor. In addition to performing prediction and encoding the residual, the compressor may pick up the right length (corresponding to the table index) to code the residuals. To determine the table index selection, some embodiments may determine the minimum and maximum residuals for each 4×4 block in the cacheline. The compressor may then select an entry in the multi-level applied compression table that specifies a range which most closely covers the determined min/max residuals. For example, in table 60 the entries may be arranged with an increasing range of min/max residual pairs (e.g., decreasing Min and increasing Max). The compressor may start at entry 0 and select the lowest numbered entry which covers the determined min/max residual values for the cacheline.

Turning now to FIG. 8, an illustrative set of compressed cachelines (CLs) may be decoded as described above in connection with FIG. 7. A value of UC may correspond to an uncompressed seed value. A value of 1D may correspond to a compressed error based on 1 of top/left/bottom/right predictions. A value of 2D may correspond to a compressed error based on top/bottom and left/right predictions. There may be 4 critical paths of 4 predictions to complete the 512 bits. Some other compressed cacheline layouts may take 18 stages to decompress the whole block. Some embodiments may improve the latency by sub-dividing a 16×4 cacheline into 4 4×4 sub cachelines. Each sub cacheline may have its own uncompressed seed value, allowing for the 4 sub cachelines to be decompressed in parallel. The UC may be placed towards the center to allow for decompression to be performed outwardly from the center (e.g., a radius may be smaller than diameter). Some embodiments may advantageously need only 4 stages that may be done in parallel.

The size in bits of each 4×4 may be variable based on the complexity of each block. Advantageously, by knowing the number of bits for each 4×4, the offsets to the starting point of each 4×4 may be computed to enable for parallel decompression. Rather than including three (3) 9-bit offset values inside the cacheline header, some embodiments of a decoder may compute the offsets based on the other information provided by the header.

The illustration shown in FIG. 8 may correspond to a monochrome case. In the case where the pixels were detected as ARGBARGBARGB and so on, the compressor may make a 4×4 of A, a 4×4 of R, 4×4 of G, and 4×4 of B. Within each 4×4, the compression/decompression may be handled the same as the monochrome case, then the decompressor may swizzle the bytes back into ARGBARGBARGB. For a similar case of YUYV (YUY2), two (2) 4×4 blocks will be Y, one (1) 4×4 will be U, and one (1) 4×4 will be V. These cases may all include 8-bit values per component. In the case of higher bit depths, some embodiments may utilize 4×2 blocks of 16-bit datatypes which may still have 16 pixels per 4×4 group of data.

In some embodiments, the detection logic may be performed for just one of the sub-divided regions. The analysis for the one sub-divided region may then be applied to the whole block to reduce the amount of redundant analysis. Advantageously, the offset to the starting bit location within the compressed cacheline may be inferred (e.g., not explicitly signaled) by inspection of the header. Some embodiments may provide one or more uncompressed seeds. For example, some embodiments may provide only one seed for a first sub-region, and then compress the other three pseudo-seeds as a delta from the only raw coded seed. Providing four raw seeds may further reduce the latency, but only one seed (e.g., uncompressed pixel value) may be needed.

Figure 9:
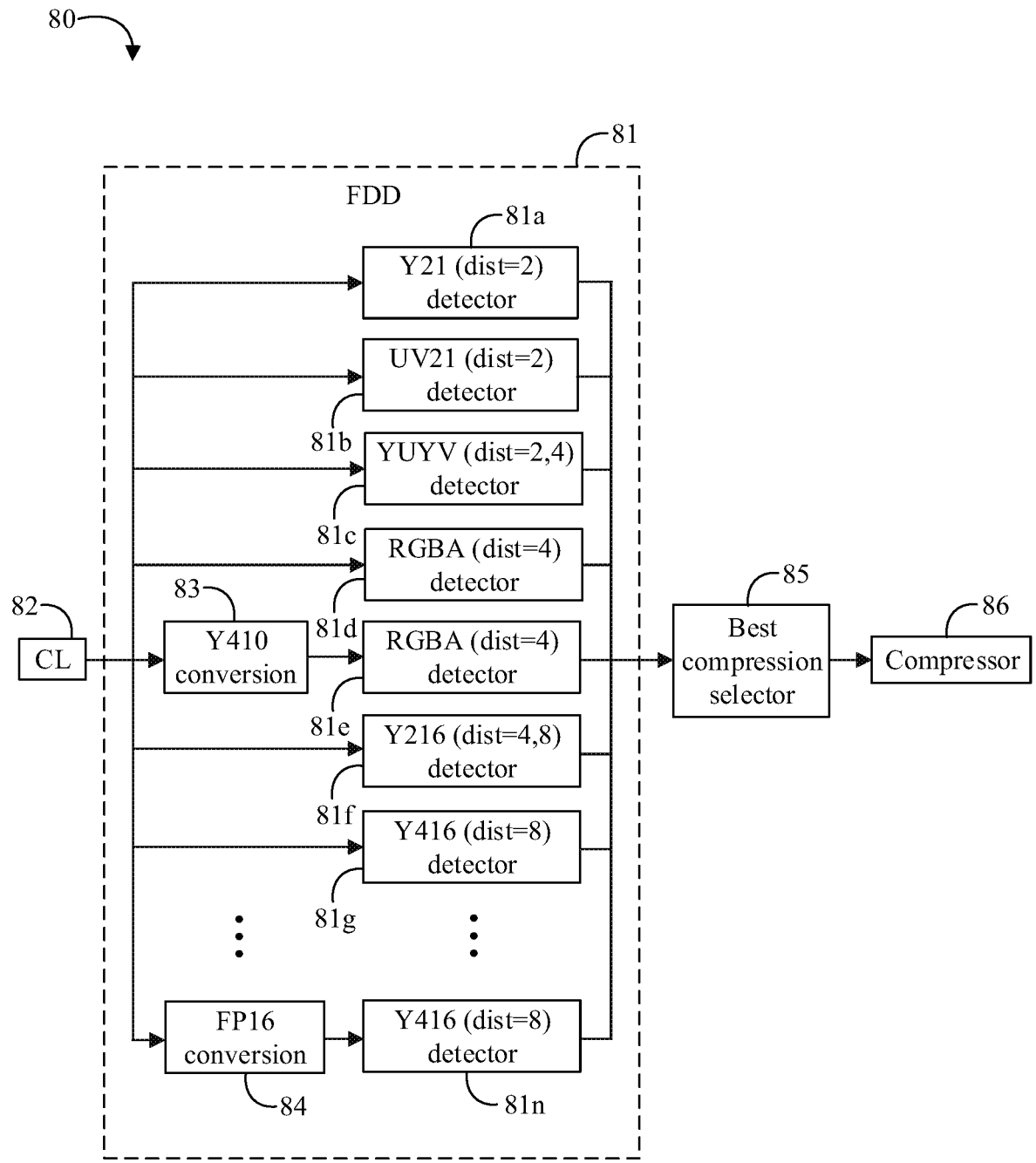
FIG. 9 is a block diagram of another example of a lossless pixel compressor according to an embodiment.

Turning now to FIG. 9, an embodiment of a compressor 80 may include a format and depth detector (FDD) 81 communicatively coupled to a cacheline buffer 82. For example, the cacheline buffer 82 may store two or more cachelines of pixel data. The FDD 81 may include two or more detectors 81a through 81n. Each of the detectors may include technology to detect a specific pixel packing format and/or pixel depth. Example pixel depths may include an eight (8) bit depth (e.g., a byte depth), a sixteen (16) bit depth (e.g., a word depth), a ten (10) bit depth (e.g., 16 bits with 6 always zero), a twelve (12) bit depth (e.g., 16 bits with 4 always zero), etc. For example, detector 81a may be configured to detect a Y21 (dist=2) format (e.g., where "dist" corresponds to the distance of the same channel pixels in the pixel memory region), detector 81b may be configured to detect a UV21 (dist=2) format, detector 81c may be configured to detect a YUYV (dist=2, 4) format, detector 81d may be configured to detect a RGBA (dist=4) format, detector 81e may be configured to detect a RGBA (dist=4) format following a Y410 converter 83, detector 81f may be configured to detect a Y216 (dist=4, 8) format, detector 81g may be configured to detect a Y416 (dist=8) format, detector 81n may be configured to detect a Y416 format following a FP16 converter 84, and so on (e.g., other converters and/or format detectors may be included).

The detectors 81a through 81n may be coupled in parallel for performance and the FDD 81 may provide a result of the format detection to a compression selector 85. The compression selector 85 may analyze the data in the cacheline buffer 82 and/or the detected format information to select a best compression technique for the data in the cacheline buffer 82. For example, the compression selector 85 may apply one or more compression techniques to a portion of the data in the cacheline buffer 82 to determine if any of the available compression techniques achieve a target compression rate (e.g., 2:1 compression, 3:2 compression, 4:3 compression, 3:1 compression, etc.). In some embodiments, the compression selector 85 may apply all available compression techniques and select the compression technique which provides the best compression. Alternatively, in some embodiments, the compression selector 85 may select the first applied compression technique which provides good enough compression (e.g., as compared to a threshold or range of acceptable compression).

Pseudo-code for a multi-format, multi-depth detection structure may be represented as follows:

may include a first estimator 93 for 4×4 block0 and a second estimator 94 for 4×4 block3 to determine different bitcost estimates for the various depths. The bitcost estimator 93 may include logic to perform counting of a number of residual shift zero operations for 2-bits, 3-bits, and 4-bits (e.g., numRes_shift0(2 bit, 3 bit, 4 bit)) for the 4×4 block0 and, if depth detection is allowed, performing similar operations for shift two, shift three, and shift four operations (e.g., numRes_shift2(2 bit, 3 bit, 4 bit), and so on). For example, numRes_shiftx (2 bit) may refer to the number of residuals that can be represented with 2-bits after the residual is shifted by x bit within one 4×4 group. Logic 93b may calculate the bitcost for the shift zero operation (e.g., see FIG. 11 below). When shift detection is needed, logic 93c may raw code the bitcost for the shift two operation as 16*6=96, logic 93d may raw code the bitcost for the shift three operation as 16*4=64, and logic 93e may raw code the bitcost for the shift four operation as 16*2=32.

Similarly, the bitcost estimator 94 may include logic to perform counting of a number of residual shift zero operations for 2-bits, 3-bits, and 4-bits (e.g., numRes_shift0(2 bit, 3 bit, 4 bit)) for the 4×4 block3 and, if depth detection is allowed, performing similar operations for shift two, shift three, and shift four operations (e.g., numRes_shift2(2 bit, 3 bit, 4 bit), and so on). The same operations may be applied to 4×4 block 1 and 2 as well. Logic 94b may calculate the bitcost for the shift zero operation (e.g., see FIG. 11 below). When shift detection is needed, logic 94c may raw code the bitcost for the shift two operation as 16*6=96, logic 94d may raw code the bitcost for the shift three operation as 16*4=64, and logic 94e may raw code the bitcost for the shift four operation as 16*2=32. A best depth selector 95 may be configured to determine the best depth value based on the estimated bitcosts.

```
const surfaceFormat surfaceConfig[ ] =
{
//config index, config name, config class, shift, shift detectable, num of seeds
    {0,  "NV12_Y",            Y21,     {0, 0, 0, 0}, {0, 0, 0, 0}, {1, 1, 1, 1}},
    {1,  "NV12_UV_P016_P216_Y", UV21,  {0, 0, 0, 0}, {1, 0, 1, 0}, {1, 1, 1, 1}},
    {2,  "P010_P210_Y",        UV21,    {6, 0, 6, 0}, {1, 0, 1, 0}, {0, 1, 0, 1}},
    {3,  "P012_P212_Y",        UV21,    {4, 0, 4, 0}, {1, 0, 1, 0}, {0, 1, 0, 1}},
    {4,  "P014_P214_Y",        UV21,    {2, 0, 2, 0}, {1, 0, 1, 0}, {0, 1, 0, 1}},
    {5,  "RGBA_P016_P216_UV ", RGBA,    {0, 0, 0, 0}, {1, 0, 1, 0}, {1, 1, 1, 1}},
    {6,  "P010_P210_UV",       RGBA,    {6, 0, 6, 0}, {1, 0, 1, 0}, {0, 1, 0, 1}},
    {7,  "P012_P212_UV",       RGBA,    {4, 0, 4, 0}, {1, 0, 1, 0}, {0, 1, 0, 1}},
    {8,  "P014_P214_UV",       RGBA,    {2, 0, 2, 0}, {1, 0, 1, 0}, {0, 1, 0, 1}},
    {9,  "Y410",               RGBA,    {0, 0, 0, 2}, {0, 0, 0, 1}, {1, 1, 1, 0}},
    {10, "YUY2",               YUYV,    {0, 0, 0, 0}, {0, 0, 0, 0}, {1, 1, 1, 1}},
    {11, "UYVY",               YUYV,    {0, 0, 0, 0}, {0, 0, 0, 0}, {1, 1, 1, 1}},
    {12, "Y216",               Y216,    {0, 0, 0, 0}, {1, 0, 1, 0}, {1, 1, 2, 2}},
    {13, "Y210",               Y216,    {6, 0, 6, 0}, {1, 0, 1, 0}, {0, 1, 0, 2}},
    {14, "Y212",               Y216,    {4, 0, 4, 0}, {1, 0, 1, 0}, {0, 1, 0, 2}},
    {15, "Y214",               Y216,    {2, 0, 2, 0}, {1, 0, 1, 0}, {1, 1, 2, 2}},
    {16, "Y416",               RGBA16,  {0, 0, 0, 0}, {1, 0, 1, 0}, {2, 2, 2, 2}},
    {17, "Y410F",              RGBA16,  {6, 0, 6, 0}, {1, 0, 1, 0}, {0, 2, 0, 2}},
    {18, "Y412",               RGBA16,  {4, 0, 4, 0}, {1, 0, 1, 0}, {0, 2, 0, 2}},
    {19, "Y414",               RGBA16,  {2, 0, 2, 0}, {1, 0, 1, 0}, {0, 2, 0, 2}},
    {20, "FP16P16_Y",          RGBA16,  {0, 0, 0, 0}, {1, 0, 1, 0}, {2, 2, 2, 2}},
    {21, "FP16P10_Y",          RGBA16,  {6, 0, 6, 0}, {1, 0, 1, 0}, {0, 2, 0, 2}},
    {22, "FP16P12_Y",          RGBA16,  {4, 0, 4, 0}, {1, 0, 1, 0}, {0, 2, 0, 2}},
    {23, "FP16P16_Y",          RGBA16,  {2, 0, 2, 0}, {1, 0, 1, 0}, {0, 2, 0, 2}}
};
```

Figure 10:
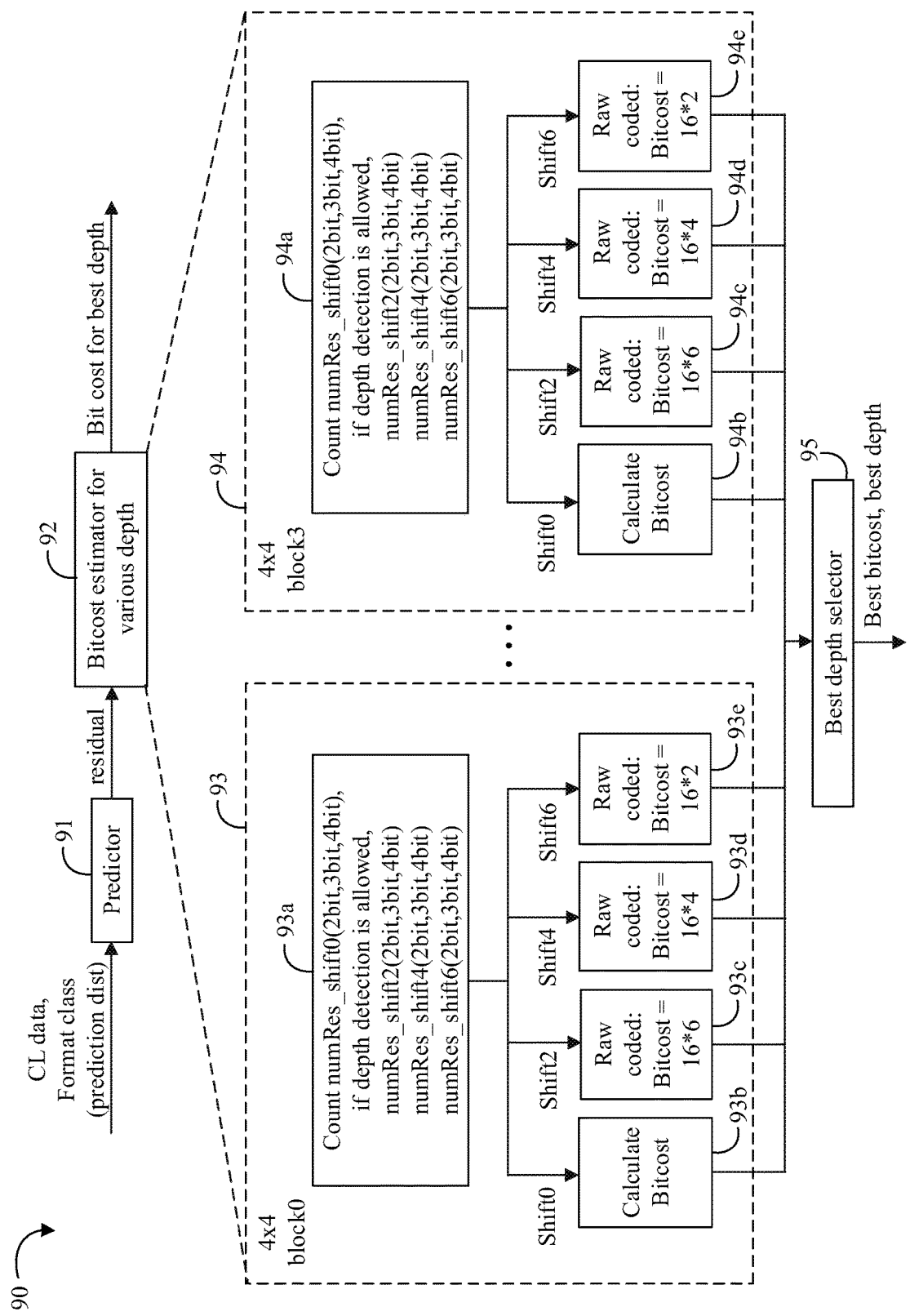
FIG. 10 is a block diagram of an example of a format and depth detector according to an embodiment.

Turning now to FIG. 10, an embodiment of a format and depth detector 90 may include a predictor 91 to determine a prediction based on cacheline data, format class information (e.g., including prediction dist), etc. and to provide residual data based on the prediction. The detector 90 may further include a bitcost estimator 92 to estimate a bitcost for various depth values and to provide an estimated bitcost for the best depth value. For example, the bitcost estimator 92

Figure 11:
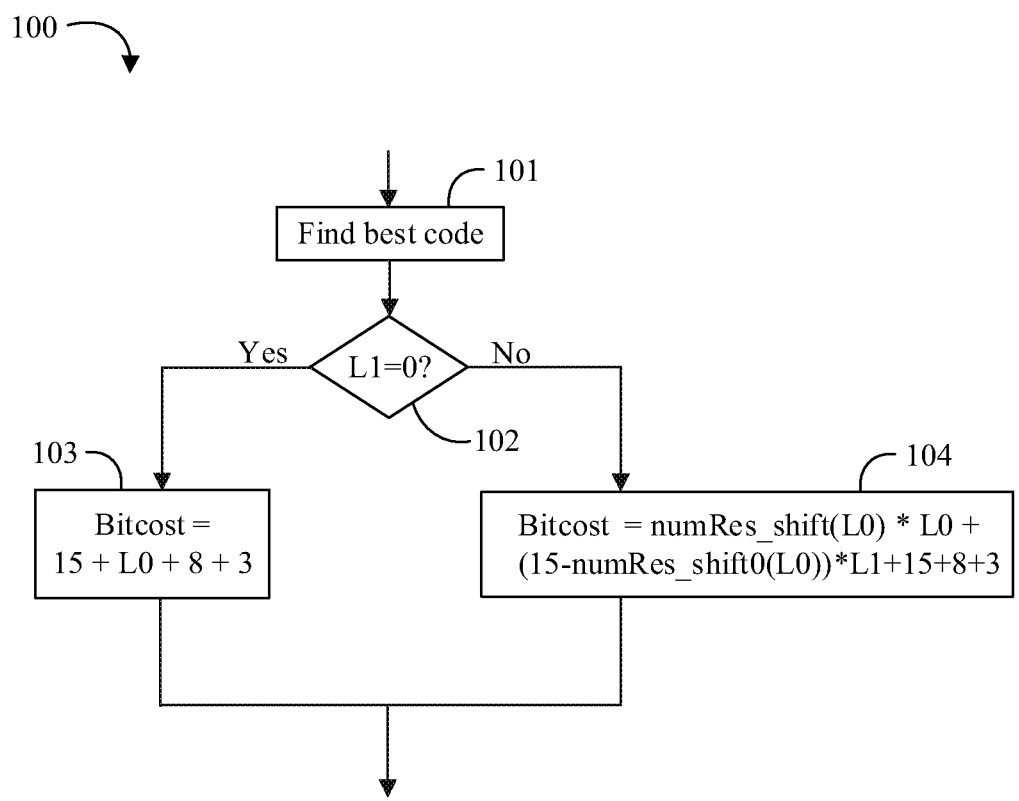
FIG. 11 is a block diagram of an example of a bitcost calculator according to an embodiment.

Turning now to FIG. 11, an embodiment of a method 100 of calculating a bitcost may include finding the best code at block 101, and determining if L1=0 at block 102. If so, the bitcost may be calculated at block 103 as the number of bits for the bitmap (e.g., 15) plus L0 plus the number of bits for the seed in the 4×4 block (e.g., 8) plus the number of bits for the table index (e.g., 3). Otherwise, the bitcost may be calculated at block 104 as follows:

$$\begin{aligned} bitcost = {} & \text{numRes\_shift}(L0) * L0 + \\ & (\text{bitmap\_size} - \text{numRes\_shift}(L0)) * L1 + \\ & \text{bitmap\_size} + \text{seed\_size\_in\_bits} + \text{table\_index\_size} \end{aligned} \quad \text{[Eq. 2]}$$

where bitmap_size corresponds to the number of bits in the bitmap, seed_size_in_bits corresponds to the number of bits to represent the seed in the 4×4 block, and table_index_size corresponds to the number of bits for the table index. In some embodiments, the calculations may be all or predominantly integer calculations. Some embodiments may additionally or alternatively utilize floating point calculations.

Advantageously, some embodiments may utilize the multi-level applied compression table together with embedded control information to simplify the compression/decompression process without sideband information. Some embodiments may additionally, or alternatively, improve the power and performance for video and pixel based memory applications without degrading image quality.

Figure 12:
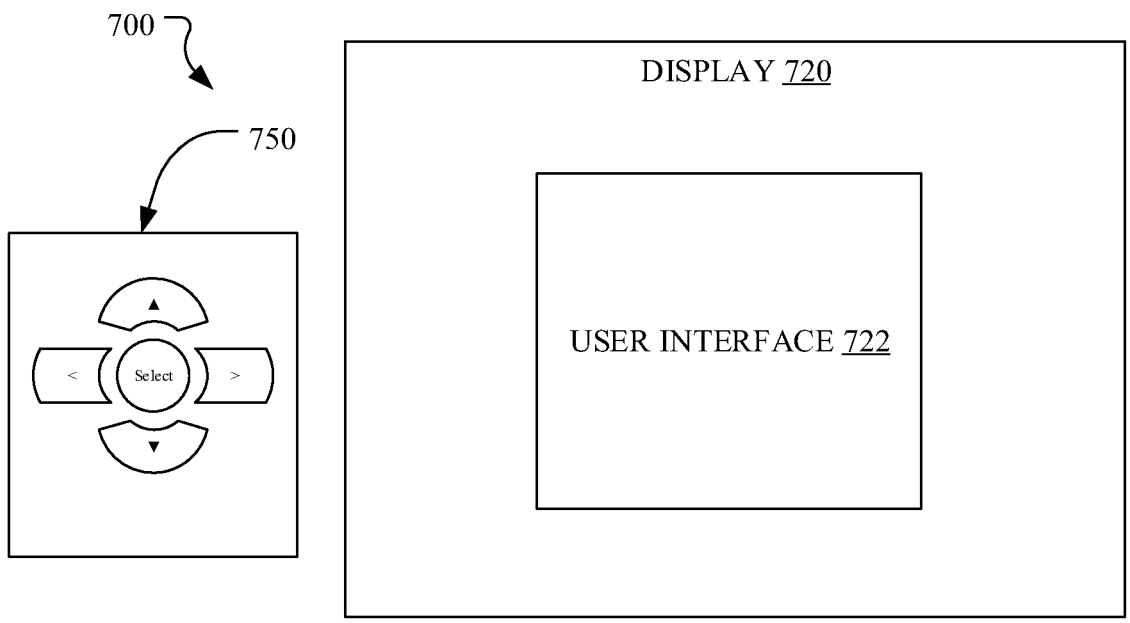
FIG. 12 is a block diagram of an example of a system having a navigation controller according to an embodiment.
Figure 12:
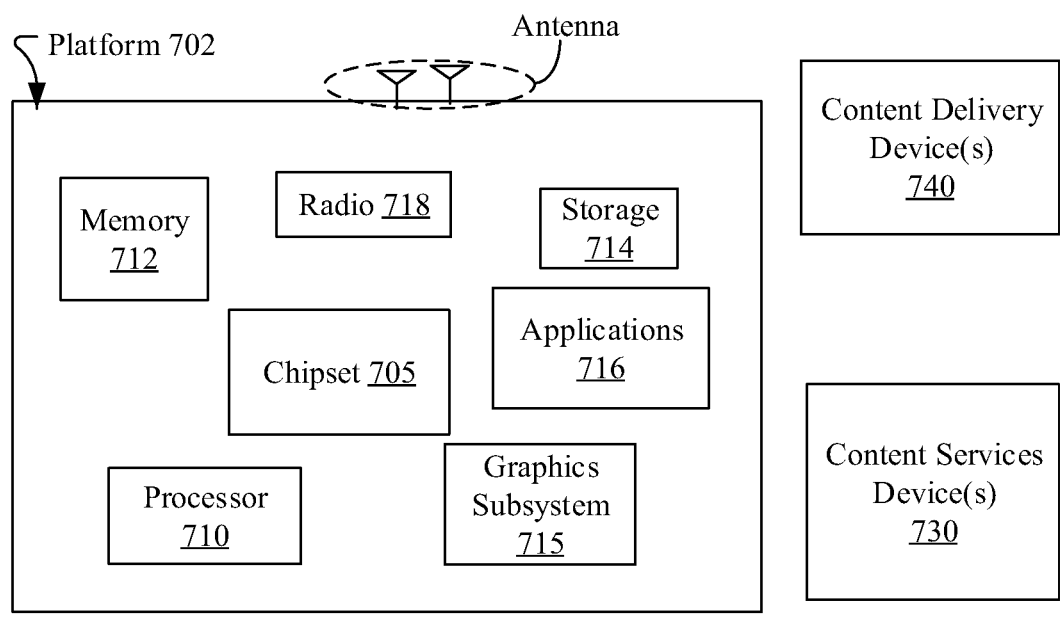
Figure 12:
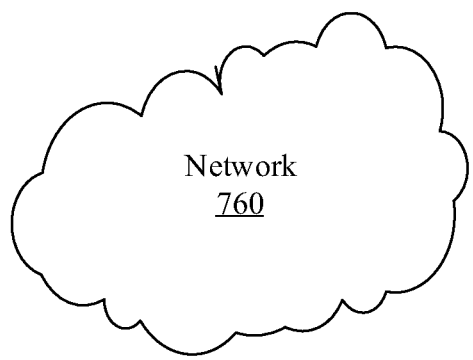

FIG. 12 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
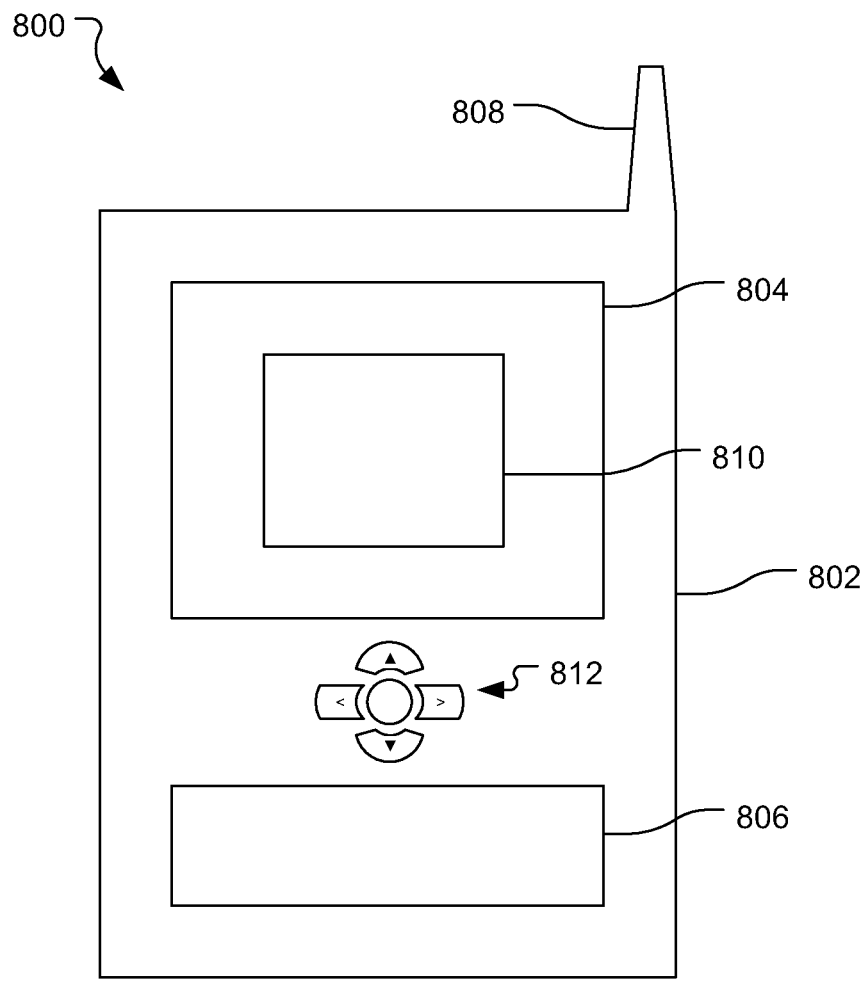
FIG. 13 is a block diagram of an example of a system having a small form factor according to an embodiment.

As described above, the system 700 may be embodied in varying physical styles or form factors. FIG. 13 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In accordance with some embodiments, the system 700 and/or the device 800 may be advantageously configured with one or more features of a lossless pixel compressor/decompressor as described herein (e.g., including multi-depth and/or multi-format detection). For example, the system 700 and/or the device 800 may include one or more of the features described in the below Additional Notes and Examples.

Additional Notes and Examples

Example 1 may include a semiconductor package apparatus, comprising a substrate, and logic coupled to the substrate, wherein the logic is at least partly implemented in one or more of configurable logic and fixed-functionality hardware logic, the logic coupled to the substrate to detect a format of a pixel memory region, and compress the pixel memory region together with embedded control information which indicates the detected format of the pixel memory region.

Example 2 may include the apparatus of Example 1, wherein the logic is further to determine compression results for two or more compression techniques, select one of the two or more compression techniques based on the determined compression results, and compress the pixel memory region using the selected compression technique together with the embedded control information.

Example 3 may include the apparatus of Example 2, wherein the logic is further to compress a portion of the pixel memory region using one of the two or more compression techniques, and estimate the compression results for the entire pixel memory region based on a compression result for the compressed portion of the pixel memory region.

Example 4 may include the apparatus of Example 2, wherein the logic is further to compare a compression result for one of the two or more compression techniques against a threshold, and select one of the two or more compression techniques based on the threshold comparison.

Example 5 may include the apparatus of Example 1, wherein the logic is further to sub-divide cachelines into sub-regions which are independently compressible.

Example 6 may include the apparatus of Example 1, wherein the logic is further to sub-divide cachelines into sub-regions which are independently decompressable.

Example 7 may include the apparatus of Example 1, wherein the logic is further to rearrange bytes of the pixel memory region into sub-regions based on the detected pixel format.

Example 8 may include the apparatus of any of Examples 1 to 7, wherein the logic is further to detect a depth of the pixel memory region.

Example 9 may include the apparatus of any of Examples 1 to 7, wherein the embedded control information includes an index to a multi-level applied compression table.

Example 10 may include a method of compressing pixels, comprising detecting a format of a pixel memory region, and compressing the pixel memory region together with embedded control information which indicates the detected format of the pixel memory region.

Example 11 may include the method of Example 10, further comprising determining compression results for two or more compression techniques, selecting one of the two or more compression techniques based on the determined compression results, and compressing the pixel memory region using the selected compression technique together with the embedded control information.

Example 12 may include the method of Example 11, further comprising compressing a portion of the pixel memory region using one of the two or more compression techniques, and estimating the compression results for the entire pixel memory region based on a compression result for the compressed portion of the pixel memory region.

Example 13 may include the method of Example 11, further comprising comparing a compression result for one of the two or more compression techniques against a threshold, and selecting one of the two or more compression techniques based on the threshold comparison.

Example 14 may include the method of Example 10, further comprising sub-dividing cachelines into sub-regions which are independently compressible.

Example 15 may include the method of Example 10, further comprising sub-dividing cachelines into sub-regions which are independently decompressable.

Example 16 may include the method of Example 10, further comprising rearranging bytes of the pixel memory region into sub-regions based on the detected pixel format.

Example 17 may include the method of any of Examples 10 to 16, further comprising detecting a depth of the pixel memory region.

Example 18 may include the method of any of Examples 10 to 16, wherein the embedded control information includes an index to a multi-level applied compression table.

Example 19 may include at least one computer readable medium, comprising a set of instructions, which when executed by a computing device, cause the computing device to detect a format of a pixel memory region, and compress the pixel memory region together with embedded control information which indicates the detected format of the pixel memory region.

Example 20 may include the at least one computer readable medium of Example 19, comprising a further set of instructions, which when executed by the computing device, cause the computing device to determine compression results for two or more compression techniques, select one of the two or more compression techniques based on the determined compression results, and compress the pixel memory region using the selected compression technique together with the embedded control information.

Example 21 may include the at least one computer readable medium of Example 20, comprising a further set of instructions, which when executed by the computing device, cause the computing device to compress a portion of the pixel memory region using one of the two or more compression techniques, and estimate the compression results for the entire pixel memory region based on a compression result for the compressed portion of the pixel memory region.

Example 22 may include the at least one computer readable medium of Example 20, comprising a further set of instructions, which when executed by the computing device, cause the computing device to comparing a compression result for one of the two or more compression techniques against a threshold, and selecting one of the two or more compression techniques based on the threshold comparison.

Example 23 may include the at least one computer readable medium of Example 19, comprising a further set of instructions, which when executed by the computing device, cause the computing device to sub-divide cachelines into sub-regions which are independently compressible.

Example 24 may include the at least one computer readable medium of Example 19, comprising a further set of instructions, which when executed by the computing device, cause the computing device to sub-divide cachelines into sub-regions which are independently decompressable.

Example 25 may include the at least one computer readable medium of Example 19, comprising a further set of instructions, which when executed by the computing device, cause the computing device to rearrange bytes of the pixel memory region into sub-regions based on the detected pixel format.

Example 26 may include the at least one computer readable medium of any of Examples 19 to 25, comprising a further set of instructions, which when executed by the computing device, cause the computing device to detecting a depth of the pixel memory region.

Example 27 may include the at least one computer readable medium of any of Examples 19 to 25, wherein the embedded control information includes an index to a multi-level applied compression table.

Example 28 may include an electronic processing system, comprising a processor, memory communicatively coupled to the processor, and logic communicatively coupled to the processor to detect a format of a pixel memory region, and compress the pixel memory region together with embedded control information which indicates the detected format of the pixel memory region.

Example 29 may include the system of Example 28, wherein the logic is further to determine compression results for two or more compression techniques, select one of the two or more compression techniques based on the determined compression results, and compress the pixel memory region using the selected compression technique together with the embedded control information.

Example 30 may include the system of Example 29, wherein the logic is further to compress a portion of the pixel memory region using one of the two or more compression techniques, and estimate the compression results for the entire pixel memory region based on a compression result for the compressed portion of the pixel memory region.

Example 31 may include the system of Example 29, wherein the logic is further to compare a compression result for one of the two or more compression techniques against a threshold, and select one of the two or more compression techniques based on the threshold comparison.

Example 32 may include the system of Example 28, wherein the logic is further to sub-divide cachelines into sub-regions which are independently compressible.

Example 33 may include the system of Example 28, wherein the logic is further to sub-divide cachelines into sub-regions which are independently decompressable.

Example 34 may include the system of Example 28, wherein the logic is further to rearrange bytes of the pixel memory region into sub-regions based on the detected pixel format.

Example 35 may include the system of any of Examples 28 to 34, wherein the logic is further to detect a depth of the pixel memory region.

Example 36 may include the system of any of Examples 28 to 34, wherein the embedded control information includes an index to a multi-level applied compression table.

Example 37 may include a pixel compressor apparatus, comprising means for detecting a format of a pixel memory region, and means for compressing the pixel memory region together with embedded control information which indicates the detected format of the pixel memory region.

Example 38 may include the apparatus of Example 37, further comprising means for determining compression results for two or more compression techniques, means for selecting one of the two or more compression techniques based on the determined compression results, and means for compressing the pixel memory region using the selected compression technique together with the embedded control information.

Example 39 may include the apparatus of Example 38, further comprising means for compressing a portion of the pixel memory region using one of the two or more compression techniques, and means for estimating the compression results for the entire pixel memory region based on a compression result for the compressed portion of the pixel memory region.

Example 40 may include the apparatus of Example 38, further comprising means for comparing a compression result for one of the two or more compression techniques against a threshold, and means for selecting one of the two or more compression techniques based on the threshold comparison.

Example 41 may include the apparatus of Example 37, further comprising means for sub-dividing cachelines into sub-regions which are independently compressible.

Example 42 may include the apparatus of Example 37, further comprising means for sub-dividing cachelines into sub-regions which are independently decompressable.

Example 43 may include the apparatus of Example 37, further comprising means for rearranging bytes of the pixel memory region into sub-regions based on the detected pixel format.

Example 44 may include the apparatus of any of Examples 37 to 43, further comprising means for detecting a depth of the pixel memory region.

Example 45 may include the apparatus of any of Examples 37 to 43, wherein the embedded control information includes an index to a multi-level applied compression table.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor package apparatus, comprising:
a substrate; and
logic coupled to the substrate, wherein the logic is at least partly implemented in one or more of configurable logic and fixed-functionality hardware logic, the logic coupled to the substrate to:
  detect a format of a pixel memory region based on an analysis of the pixel memory region, and
  compress the pixel memory region together with embedded control information which indicates the detected format of the pixel memory region.

2. The apparatus of claim 1, wherein the logic is further to:
determine compression results for two or more compression techniques;
select one of the two or more compression techniques based on the determined compression results; and
compress the pixel memory region using the selected compression technique together with the embedded control information.

3. The apparatus of claim 2, wherein the logic is further to:
compress a portion of the pixel memory region using one of the two or more compression techniques; and
estimate the compression results for the entire pixel memory region based on a compression result for the compressed portion of the pixel memory region.

4. The apparatus of claim 2, wherein the logic is further to:
compare a compression result for one of the two or more compression techniques against a threshold; and
select one of the two or more compression techniques based on the threshold comparison.

5. The apparatus of claim 1, wherein the logic is further to:
sub-divide cachelines into sub-regions which are independently compressible.

6. The apparatus of claim 1, wherein the logic is further to:
sub-divide cachelines into sub-regions which are independently decompres sable.

7. The apparatus of claim 1, wherein the logic is further to:
rearrange bytes of the pixel memory region into sub-regions based on the detected pixel format.

8. The apparatus of claim 1, wherein the logic is further to:
detect a depth of the pixel memory region.

9. The apparatus of claim 1, wherein the embedded control information includes an index to a multi-level applied compression table.

10. A method of compressing pixels, comprising:
detecting a format of a pixel memory region; and
compressing the pixel memory region together with embedded control information which indicates the detected format of the pixel memory region.

11. The method of claim 10, further comprising:
determining compression rates for two or more compression techniques;
selecting one of the two or more compression techniques based on the determined compression rates; and
compressing the pixel memory region using the selected compression technique together with the embedded control information.

12. The method of claim 11, further comprising:
compressing a portion of the pixel memory region using one of the two or more compression techniques; and
estimating compression rates for the entire pixel memory region based on a compression rate for the compressed portion of the pixel memory region.

13. The method of claim 11, further comprising:
comparing a compression rate for one of the two or more compression techniques against a threshold; and
selecting one of the two or more compression techniques based on the threshold comparison.

14. The method of claim 10, further comprising:
sub-dividing cachelines into sub-regions which are independently compressible.

15. The method of claim 10, further comprising:
sub-dividing cachelines into sub-regions which are independently decompressable.

16. The method of claim 10, further comprising:
rearranging bytes of the pixel memory region into sub-regions based on the detected pixel format.

17. The method of claim 10, further comprising:
detecting a depth of the pixel memory region.

18. The method of claim 10, wherein the embedded control information includes an index to a multi-level applied compression table.

19. At least one non-transitory computer readable medium, comprising a set of instructions, which when executed by a computing device, cause the computing device to:
detect a format of a pixel memory region; and
compress the pixel memory region together with embedded control information which indicates the detected format of the pixel memory region.

20. The at least one non-transitory computer readable medium of claim 19, comprising a further set of instructions, which when executed by the computing device, cause the computing device to:
determine compression results for two or more compression techniques;
select one of the two or more compression techniques based on the determined compression results; and
compress the pixel memory region using the selected compression technique together with the embedded control information.

21. The at least one non-transitory computer readable medium of claim 20, comprising a further set of instructions, which when executed by the computing device, cause the computing device to:
compress a portion of the pixel memory region using one of the two or more compression techniques; and
estimate the compression results for the entire pixel memory region based on a compression result for the compressed portion of the pixel memory region.

22. The at least one non-transitory computer readable medium of claim 20, comprising a further set of instructions, which when executed by the computing device, cause the computing device to:
comparing a compression result for one of the two or more compression techniques against a target compression rate; and
selecting one of the two or more compression techniques based on the target compression rate comparison.

23. The at least one non-transitory computer readable medium of claim 19, comprising a further set of instructions, which when executed by the computing device, cause the computing device to:
sub-divide cachelines into sub-regions which are independently compressible.

24. The at least one non-transitory computer readable medium of claim 19, comprising a further set of instructions, which when executed by the computing device, cause the computing device to:
sub-divide cachelines into sub-regions which are independently decompressable.

25. The at least one non-transitory computer readable medium of claim 19, comprising a further set of instructions, which when executed by the computing device, cause the computing device to:
rearrange bytes of the pixel memory region into sub-regions based on the detected pixel format.

\* \* \* \* \*